T. C. DOBBINS.
SHAFT COUPLING.
APPLICATION FILED FEB. 18, 1915.
1,147,620.
Patented July 20, 1915.
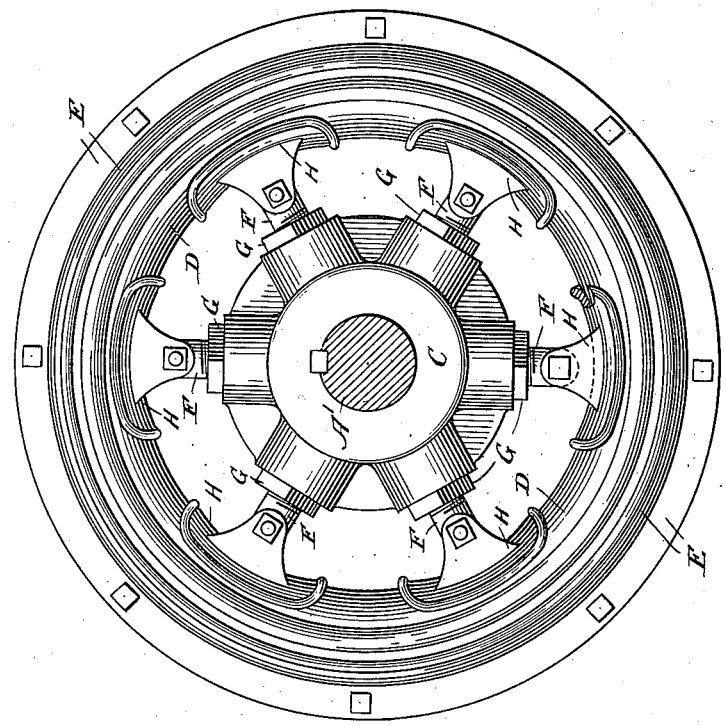
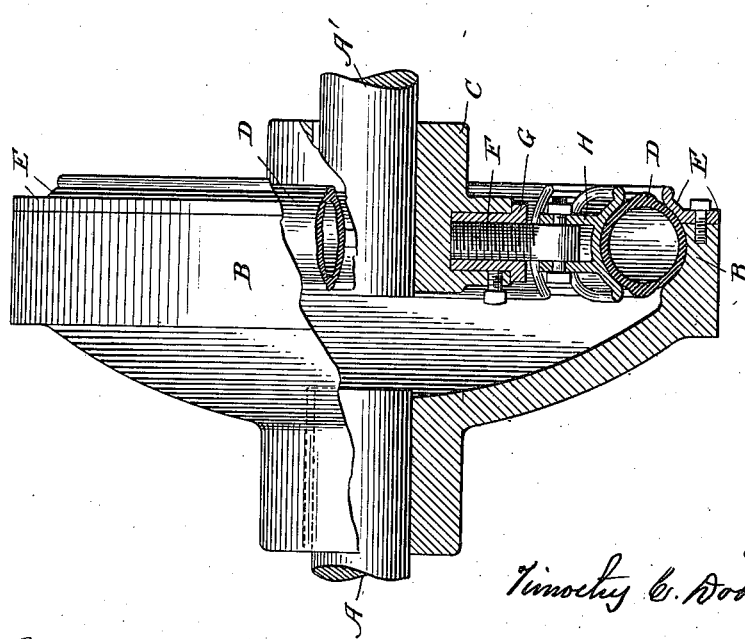
Witnesses
Edwin L. Bradford
Robert Craig Greene
Inventor
Timothy C. Dobbins
By Wallace W. Greene,
Attorney

UNITED STATES PATENT OFFICE.

TIMOTHY C. DOBBINS, OF HUNTINGTON PARK, CALIFORNIA.

SHAFT-COUPLING.

1,147,620.  Specification of Letters Patent.  Patented July 20, 1915.

Application filed February 18, 1915.  Serial No. 8,992.

*To all whom it may concern:*

Be it known that I, TIMOTHY C. DOBBINS, a citizen of the United States, residing at Huntington Park, in the county of Los Angeles and State of California, have invented certain new and useful Improvements in Shaft-Couplings, of which the following is a specification, reference being had therein to the accompanying drawing.
The object of this invention is to provide a shaft coupling which insulates coupled shafts from each other and serves equally well whether or not the shafts be exactly alined.
In the accompanying drawings, Figure 1 is a side elevation, partly in section, showing two shafts coupled by my devices. Fig. 2 is a view looking from the right in Fig. 1.

The invention involves fixing to one shaft a coupling member, fixing to the other shaft a materially larger coupling member encircling the first member, mounting resilient devices upon one of said members, and providing the other member with devices arranged to compress said resilient devices and thus strongly engage the same when there is relative rotary movement of the two shafts.

In the embodiment illustrated in the drawings, A, A' are approximately alined shafts one of which bears a rigid ring B, shown as the rim of a cup-like device fixed to the shaft A, although it might be supported from the shaft in any suitable way.
Within and spaced from this ring is a companion member C fixed to or rigidly supported from the shaft A'. In a suitable seat in the ring fits an endless tire-like pneumatic tube D, which in this instance a detachable ring E aids in keeping in place. From the member C project radial threaded studs F, preferably working in nuts G which turn freely in smooth recesses in the member C. To the outer end of each stud a shoe H is pivoted to rock in the plane of the tube over the inner side of which the shoe fits somewhat saddle-like while preferably always indenting it so long as the tube is inflated. By rotating the nuts the shoes can be adjusted for tubes varying in diameter and also for regulating the degree to which they normally indent the tube. Obviously, the relation of the shoe's face to its axis such that any rocking of the shoe on its pivot tends to increase the compression of the tube progressively and rapidly, and of course resiliency of the tube tends to restore that shoe to normal position.

The number of shoes is not invariable, but six are shown, and although the resistance to rocking of the shoes is at first very slight the rocking of many rapidly lessens the capacity of the tube and correspondingly increases resistance, so that almost any reasonable power may be transmitted, through the insulating and cushioning tube, without causing more than a slight relative rotation of the shafts. Practically no slipping is apparent, the wear on the tube is extremely small, the working is noiseless, the insulation is perfect, and imperfection in alinement or variation in alinement seem quite immaterial, such conditions merely causing more or less compression on one side or another of the tube. The tube need not be continuous, pneumatic, nor a single piece structure, but it is essential that there be proper resiliency under each shoe. Nor is it indispensable that the shoes be upon the inner member and the tube on the outer member, the essential being that the shoes carried upon one member should by eccentric movement compress a resilient medium against the other member.

What I claim is:

1. The combination with a shaft and a ring fixed to the shaft and encircling its axis, of an endless pneumatic tube carried within said ring, a second shaft, a series of rocking shoes borne by the second shaft, engaging the inner side of said tube and adapted to compress the tube progressively as they rock from normal position.

2. The combination with a shaft and a rigid ring fixed to the shaft and encircling its axis, of an endless pneumatic tube carried in the ring, a second shaft, a series of rocking shoes borne by the second shaft, engaging the inner side of the tube and adapted to compress the tube progressively as they rock from normal position, and means for radially adjusting the shoes.

3. In a shaft coupling, the combination with a member fixed to one shaft, of a second member encircling and spaced from the first and fixed to the second shaft, eccentrically mounted devices mounted in the space between said members to rock in their plane, and a compressible resilient device extending from each rocking device to the opposite member.

4. The combination with a shaft and a coupling member fixed thereto, of a second shaft, a second distinct coupling member encircling the first and secured to the second shaft, a resilient compressible member lying between said coupling members and resting against one of them, and a series of eccentrically pivoted shoes projecting from the other member against the resilient member and rocking freely in the plane of the latter.

In testimony whereof I affix my signature in presence of two witnesses.

TIMOTHY C. DOBBINS.

Witnesses:
 LEWIS CRUICKSHANK,
 E. L. BURKHART.